G. WOODVINE.
APPARATUS FOR OPERATING UPON SPLIT PACKING RINGS.
APPLICATION FILED DEC. 26, 1918.
1,318,194.
Patented Oct. 7, 1919.
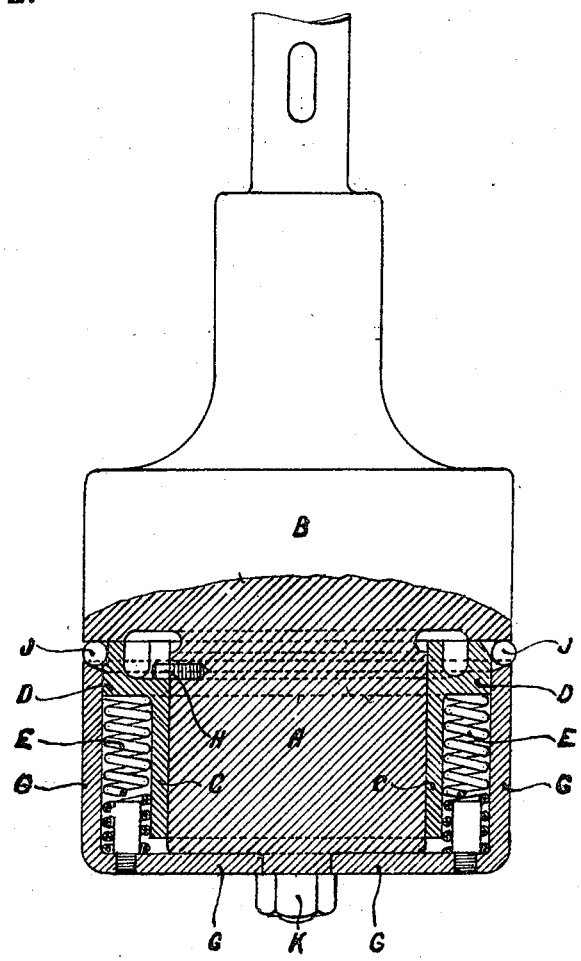
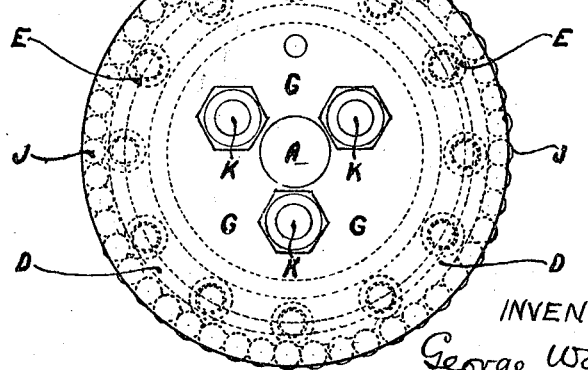
INVENTOR
George Woodvine
by Howson and Howson
Attys

UNITED STATES PATENT OFFICE.

GEORGE WOODVINE, OF SHREWSBURY, ENGLAND.

APPARATUS FOR OPERATING UPON SPLIT PACKING-RINGS.

1,318,194. Specification of Letters Patent. Patented Oct. 7, 1919.

Application filed December 26, 1918. Serial No. 268,423.

*To all whom it may concern:*

Be it known that I, GEORGE WOODVINE, a subject of the King of Great Britain and Ireland, and a resident of Shrewsbury, in the county of Salop, England, have invented certain new and useful Improvements in Apparatus for Operating Upon Split Packing-Rings, and of which the following is the specification.

In the manufacture of cut or split spring packing rings, as described in the specification accompanying my Patent No. 1,296,580 of March 4, 1919, the necessary spring is imparted to the rings, after they are turned and bored as usual, by the provision of a holder to receive the rings and a tool carrying projections arranged eccentric to the body thereof in such manner that when applied to the rings the maximum projection bears on each ring at the point opposite to the cut ends thereof, the projections gradually diminishing from this point in both directions until they finally disappear at points a little distance away from the part of the tool adjacent to and adapted to bear upon the cut ends of the rings.

In practice it has been found that unless each ring is first machined to very precise dimensions, one ring possesses more spring than another ring, after the tool had been applied to the rings.

To overcome this objection, according to the present invention there is provided a tool in which the projections, to act on the rings, are so spring supported that they will exert a definite pressure at each point of contact with the rings even though the dimensions of the rings vary within reasonable working limits.

As described in the earlier specification hereinbefore referred to, the projections are in the form of steel balls held in a groove eccentric to the body of the tool. According to this invention one portion of this groove is formed on the outer surface of an annular plunger like part spring-supported within the body of the tool, this bearing surface being partly cylindrical and partly conical so that the groove as a whole is eccentric to the body of the tool. The springs are calibrated to carry a definite load, and thus though the dimensions of the rings may vary slightly, the pressure applied by the spring supported bearing surface to the projections and so by the latter to the rings, remains definite and substantially constant.

Figure 1 on the accompanying sheet of explanatory drawings is an elevation, partly in section and Fig. 2 an inverted plan of an example of the improved construction of tool.

In carrying out the invention according to the illustrative example shown in the drawings as applied to a tool for expanding the rings, the outer end A of the body of the tool is of lesser diameter than the inner end B. On the outer end A is a sleeve C having on its inner end a flange D the outer surface of which is partly cylindrical and partly conical. The sleeve C is supported by a number of springs E extending between the flange and a cover G inclosing the springs and flanged sleeve, and held in place by three studs K screwed into the outer end A of the body of the tool. The sleeve C is of lesser depth than the part A of the tool on which it works, so that it is capable of endwise movement thereon, stops H limiting its movement in one direction and the cover G in the other direction, A space is left between the meeting edges of the cover G and the larger inner end B of the body of the tool, the inner surface of the edge of the cover being reversely conical to the cone shaped part of the flanged sleeve, these surfaces combined with the partly cylindrical and partly conical eccentric surface on the flanged sleeve form the groove, eccentric to the body of the tool, in which are held the steel balls J forming the projections hereinbefore referred to.

It will be seen that the race for the balls while being parallel with the axis of the tool on one side (that next the joint of the ring) increases in taper from that point to its maximum on the opposite side and dies away again to the parallel line as it again arrives at the side next the joint of the ring.

The tool is forced through the rings, as described in the earlier specification hereinbefore referred to, so that the metal on the inner surface thereof is indented and stretched as desired. As the springs E are calibrated to carry a definite load, it will be seen that though the projections J may be acting on rings of varying dimensions, yet the pressure exerted on all the rings will be substantially constant, as, where necessary, the flanged sleeve carrying part of the groove for the balls J will yield slightly and thus lessen the extent to which the balls project from the groove.

What I claim is:—

1. In a tool of the type described, a body adapted to be passed through a ring blank on which the tool operates, a series of projections carried by said tool eccentric to the body thereof, and spring means for holding said projections against inward displacement.

2. A tool of the type described, a body adapted to be passed through a ring blank on which the tool operates, a series of projections carried by said tool eccentric to the body thereof, a movable support with cammed face bearing against said projections, and spring means for holding said bearing support against displacement under pressure upon said projections.

3. In a tool of the type described, a body adapted to be passed through a ring blank on which the tool operates, a displaceable sleeve mounted on said tool body, a cammed surface on said sleeve forming a wall of a peripheral raceway in the tool eccentric to the body thereof, balls arranged in said raceway and projecting at least through a predetermined arc beyond the periphery of the tool body in combination with a spring bearing against said sleeve to hold it against displacement under inward pressure upon the balls in the raceway.

4. In a tool of the type described, a body adapted to be passed through a ring blank on which the tool operates, and having a hub portion of less diameter than the body of the tool, a sleeve slidable on said hub, and having at its inner end a cammed periphery, a cap secured to said hub and embracing said sleeve and forming, with the cammed portion of the sleeve and the body of the tool, a raceway eccentric to the axis of the tool, balls arranged in said raceway and projecting at least through a predetermined arc beyond the periphery of the tool body, together with spring means interposed between the cap and sleeve and serving to hold the latter against displacement under inward pressure upon the balls in the raceway.

In testimony whereof I have signed my name to this specification.

G. WOODVINE.

Copies of this patent may be obtained for five cents each, by addressing the "Commissioner of Patents, Washington, D. C."